Figure 1:
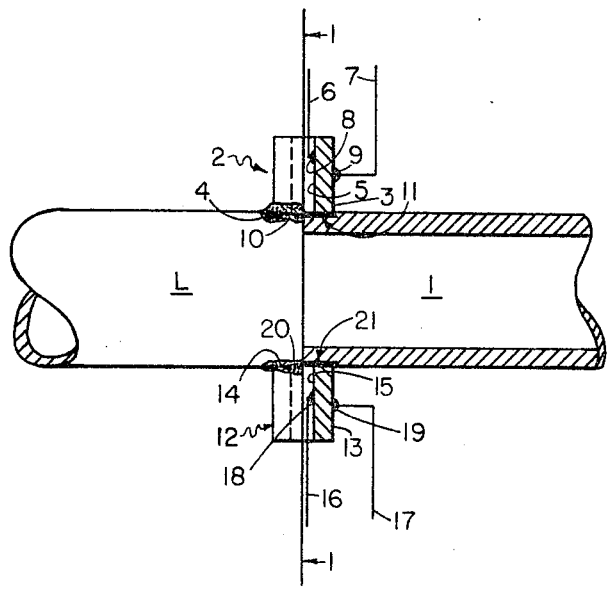

Nov. 8, 1966

C. G. HEISIG ET AL 3,283,562

FLUID TESTING BY ACOUSTIC WAVE ENERGY

Filed July 16, 1963

2 Sheets-Sheet 1

INVENTORS
CHARLES G. HEISIG
RICHARD L. MITCHELL

INVENTORS
CHARLES G. HEISIG
RICHARD L. MITCHELL

United States Patent Office 3,283,562
Patented Nov. 8, 1966

3,283,562
FLUID TESTING BY ACOUSTIC
WAVE ENERGY
Charles G. Heisig, Brighton, and Richard L. Mitchell, Rochester, N.Y., assignors to Taylor Instrument Companies, Rochester, N.Y., a corporation of New York
Filed July 16, 1963, Ser. No. 295,496
9 Claims. (Cl. 73—19)

This invention relates to fluid testing by applying acoustic wave energy to a fluid, determining the effect of said fluid thereon, and using the said effect as an index of some property or characteristic of said fluid.

In this instance, the said acoustic wave energy is radiated into a cavity containing fluid to be tested. Determination of the said effect of said fluid involves examining said acoustic wave energy after it has traversed an acoustic system including said fluid as effective part thereof.

The geometry of the cavity, the elastic properties of the member incorporating said cavity, various anisotropic and/or variable properties of said fluid (such as its thermodynamic state, physical and/or chemical composition or make-up), and so on, each has its influence on the character of the acoustic wave energy applied to it. Hence, the apparatus and/or procedure involved in this type of test must be designed so that the fluid property tested for is distinguishable upon examination of the said acoustic wave energy after it has traversed the above-said acoustic system.

The general object of this invention, therefore, is to provide new and improved method and means for determining a fluid property or condition wherein said method and means are of the general character described supra.

A particular object of this invention is to provide new and improved method and means for determining gaseous content of a liquid, wherein said method and means are of the general character described supra.

Another object of this invention is to provide new and improved method and means for determining a fluid property or condition, wherein said method and means are of the general character described supra, and wherein said method and means provide for testing fluid in situ, as in art apparatus including piping, or the like, for conducting said fluid from one place to another in the course of using said fluid in the manufacture of some useful product, but without interrupting or breaking into said piping, or otherwise altering the structural integrity of said art apparatus, for the purpose of testing the said fluid therein. This invention particularly envisages determining gas content of liquid contained in art apparatus, by use of such method and means.

A further object of the invention is to provide a new and improved cell for testing fluids by application of acoustic wave energy thereto. This invention particularly envisages determination of gas content of liquid by use of said cell.

Other objects of the invention will be evident from the description to follow, and the claims appended hereto.

Briefly described, the invention involves method and means for testing fluids wherein a limited portion of the wall of a fluid containing cavity is caused to vibrate mechanically in such fashion as to propagate acoustic wave energy in said fluid. Consequently, this acoustic wave energy is coupled, by said fluid into the wall of the cavity to cause mechanical vibration thereof that represents some part of the original mechanical vibrations, but of a character determined, in part, by the acoustic properties of said fluid, variation in such properties modulating the acoustic wave energy propagated in the fluid. Accordingly, the vibrations in said wall, coupled thereto from the said fluid, are sensed and demodulated in order to obtain information as to one or another of said acoustic properties.

In particular, where the said fluid is a liquid, gas content in the form of a bubble or a plurality of bubbles or specks of gas, the gaseous component of liquid has a marked modulating effect on acoustic wave energy propagated in said fluid. Confining the mechanical vibrations exciting said fluid to a limited portion of the cavity wall insures there being other portions of said wall which not only vibrate mechanically in accordance with acoustic wave energy in said fluid but which are largely free of the original mechanical vibrations except to the extent these last are coupled into the cavity wall via said fluid.

The notion of acoustic wave energy is used broadly herein as referring to compressional waves due to oscillating motion of the particles of a material medium, wherein the waves generally travel along a path that corresponds, directionally, to the path of oscillation of said particles. Acoustic wave energy, in this sense, is not confined to the range of the human ear, but ranges from subsonic to megacycle frequencies. However, as will be seen hereinbelow, the preferred range, while definitely ultrasonic, is also well below megacycle values.

Figure 2:
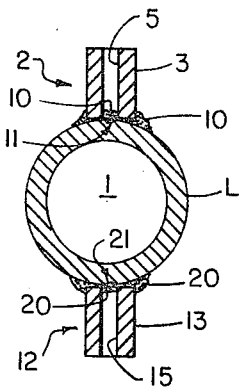
Figure 4:
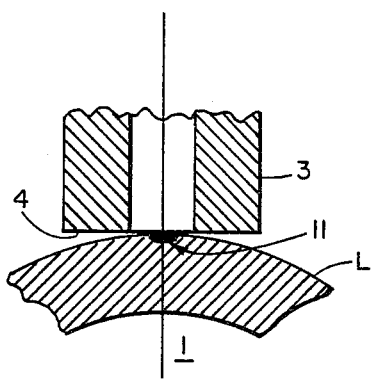
Figure 3:
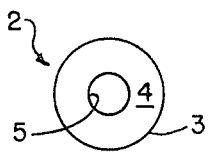
Figure 5:
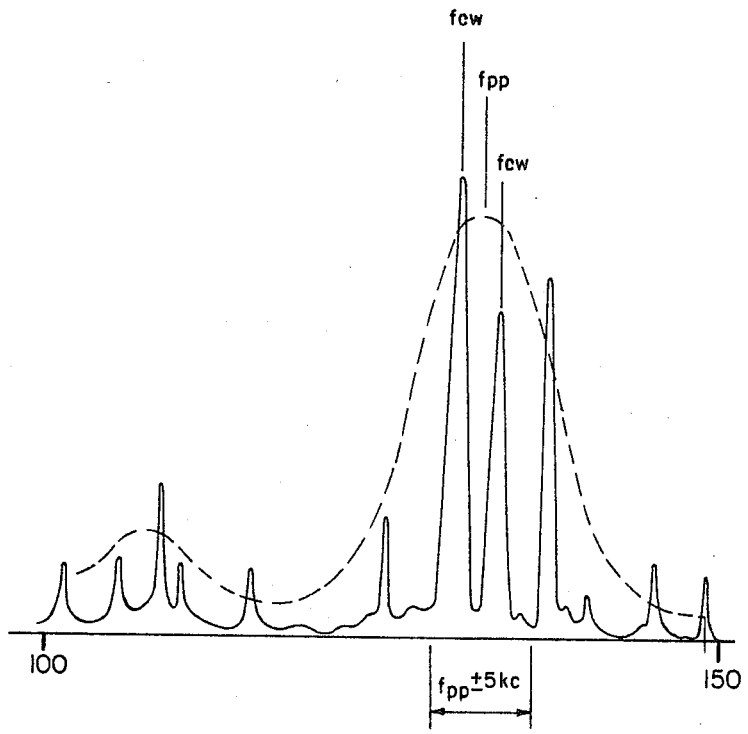
Figure 6:
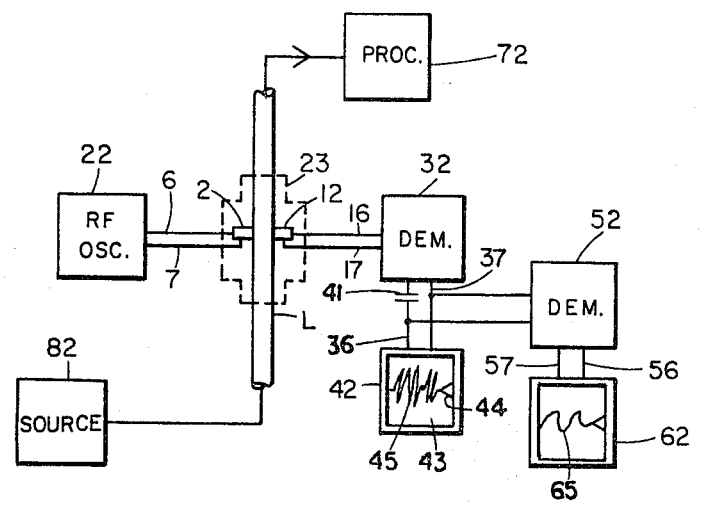

In the drawings:
FIGURE 1 is a drawing, partly in section of a test arrangement according to the invention;
FIGURE 2 is a section on the lines 1—1 of FIGURE 2;
FIGURE 3 is a view of an element of FIGURE 1;
FIGURE 4 is an enlarged detail of FIGURE 2;
FIGURE 5 is a frequency response diagram;
FIGURE 6 is a sketch of the test arrangement according to the invention, and including electrical circuitry suitable for use therewith.

In FIGURE 1, a test arrangement according to the invention incorporates a pipe section L. Section L is part of a flow line (not shown), providing not only for maintenance of flow through the line, but also for applying acoustic wave energy to fluid flowing through the pipe section L.

As indicated by the section on line 1—1 (FIGURE 2), pipe section L is in the form of a circular cylinder. One function of the section L is to provide an acoustically-active cavity 1, which is more or less coincident with the bore of pipe section L, and extending therealong a distance that is typically several diameters of the pipe section L.

According to the invention, the cavity 1 (including the fluid therein, of course) is excited by a source of mechanical vibration applied to, in effect, a substantially zero-area, substantially rectilinear line segment lying on the outer surface of the pipe section L, said line segment preferably lying in a plane containing the cylindrical axis of pipe section L.

According to the invention, a transducer having an active element in the form of a flat surface vibratable transverse to its plane, is secured to pipe section L, with the said flat surface in direct contact with the external surface of section L. Since section L is curved and cylindrical, such contact is substantially coincident with a straight line segment parallel to the cylinder axis and lying in the cylindrical surface defining the outer surface of pipe section L. The active element of the transducer is therefore directly coupled acoustically to the wall of pipe section L through direct contact of substantially zero area.

While the transducer may be clamped to the pipe, it is preferable where possible, to cement the flat surface of the transducer's active element to the pipe, utilizing for this purpose a stable material of acoustically-uniform properties. A number of epoxy adhesives, commercially available in both heat-curing and mix-curing forms, have been found especially satisfactory.

While there are various types of transducers having active elements capable of direct coupling to a surface via a substantially zero-area, substantially rectilinear contact with the latter, a transducer of the type illustrated in FIGURES 1, 2 and 3 is to be preferred, and therein a transducer 2 consisting of a circularly-cylindrical body 3 having flat end faces, one of which is denoted by the reference numeral 4, and an axial bore 5, and wherein said body 3 consists of a piezo-electric, polycrystalline, titanate ceramic material. This type of transducer is readily available and is an efficient source of mechanical vibrations directed along the cylindrical axis of the body thereof. In order to excite transducer 2 in this fashion it is merely necessary to apply an A.C. voltage between the surface of the bore 5 of body 3 and the outer cylindrical surface of body 3. For this purpose, electrodes in the form of conductive coatings (not shown) capable of having conductive leads soldered thereto, are provided on the inner and outer cylindrical surfaces of body 3. The end faces of the body 3 and, if necessary, adjoining portions of the said cylindrical surfaces, are left bare to isolate the said electrodes each from the other. Thus, leads 6 and 7 are soldered at 8 and 9, respectively, to such electrodes, whereby an A.C. voltage applied across said leads will cause the body 3 to alternately expand and contract along its cylindrical axis.

Transducer 2 is positioned with its end face 4 in contact with the outer surface of pipe section L, the cylindrical axis of the body 3 coinciding with a straight line containing a diameter of pipe section L. As a result, a diameter of the end face 4 contacts the external surface of pipe section L in a line-segment-like, substantially zero-area coupling region 11 (portrayed in heavy black line for emphasis). Everywhere else between the annular end face 4 of body 3 and the outer surface of pipe section L, a layer 10 of cement integrally binds the body 3 to pipe section L. Since bore 5 opens through face 4, there may be more or less of a hiatus in the region 11, corresponding to the bore end, for at best the coupling here is via cement layer 10. The hiatus is of no consequence, and means merely that the effective length of region 11 is perhaps a little less than it would be were the body 3 a solid cylinder. Actually, the exact dimensions of region 11 are neither very well defined in any event, nor does the invention require that they be.

It will be evident from the foregoing that, if transducer 2 be energized as aforesaid, i.e., in its longitudinal mode, acoustic wave energy will tend to be transmitted into the wall of pipe through coupling region 11. While a certain amount of acoustic wave energy will penetrate the pipe wall via the layer 10 of cement, the diameter of end face 4 may be as large as ⅓ the outer diameter of pipe section L before the coupling through the cement reaches the point of requiring consideration. In practice, a transducer-diameter/pipe-section-diameter ratio of 1 to 4 give good results.

In consequence of the restricted coupling to pipe section L, a minimum of acoustic wave energy is propagated in the wall of pipe section 1 along directions such as would tend to conduct the wave energy around and along pipe section L between the inner and outer surface of its wall. Acoustic wave energy traveling through layer 10 tends to be focused on the cylindrical axis of pipe section L by the interface between the cement and the external surface of pipe section L, and propagation in the wall of the pipe, around the cavity, is inversely proportional to the aforesaid diameter ratio.

On the other hand, a maximum amount of acoustic wave energy is propagated through the radial thickness of the wall and in directions wherein the paths between the inner and outer surfaces of pipe section L are of lengths on the order of the shortest path therebetween. This latter component of acoustic wave energy is coupled into fluid in cavity 1 by an element of the inner surface of pipe section L, such element corresponding to coupling region 11, but of rather larger area, depending on the frequency of the said acoustic wave energy. Hence, a substantial proportion of cavity 1 in the vicinity of region 11 is traversed by acoustic wave energy. Given a particular pipe section L and transducer 2, the extent to which a cavity 1 is traversed by acoustic wave energy may be set within wide limits by proper choice of frequency and mode of excitation of transducer 2. While it is advantageous to restrict acoustic energization of said cavity in the lengthwise direction of pipe section L, it is also desirable to excite as much of the cross-section of the cavity as is possible.

The contents of cavity 1, when acoustically excited, act as a source of acoustic wave energy coupled to the wall of pipe section 1, and accordingly acoustic wave energy is propagated in the wall with characteristics reflecting the character of said contents. In other words, vibrations of end face 4 of transducer 2 eventually find their way to the outer surface of pipe section 1, but much modified by the acoustic environment in which they arose and which they traversed. The acoustic wave energy coupled out of the cavity into the pipe wall is widely distributed in the wall of pipe section L, and low in level. Nevertheless, since the relatively intense vibratory energy of transducer 4 excites mainly region 11 of the wall of pipe section L, a measurement of acoustic wave energy in the wall of pipe section L, outside of said restricted region, will reflect the character of the acoustic transmission path from transducer 2, via cavity 1 and its contents, to the outer surface of the wall of pipe section L.

Preferably, the acoustic wave energy in the wall of pipe section L is sensed by a transducer 12 exactly like transducer 2 in both structure and arrangement, except that it is displaced about the circumference of the pipe, say, to a place where the longitudinal axis of the transducer 12 coincides with the line containing both a diameter of pipe section L and the longitudinal axis of transducer 2.

Thus, transducer 12 may comprise a cylindrical titanate body 13 having flat end faces, one of which is denoted by reference number 14, longitudinal bore 15, and leads 16 and 17 soldered at 18 and 19 to inner and outer electrodes (not shown). Body 13 is integrally joined by a layer 20 of cement to the outer surface of pipe section L, with its flat face 14 directly contacting the outer area of pipe section L so as to define a substantially rectilinear, line-segment-like, substantially zero-area, coupling region 21, corresponding to coupling region 11, but directly opposite the latter. Since vibrations of the wall of pipe section L, directed transversely of the end face 14, impulsively compress the body 13, an A.C. voltage, corresponding to said vibrations, will appear across leads 16 and 17. Moreover, since the last said vibrations originate mainly from the contents of cavity 1, the last said A.C. voltage reflects the acoustic peculiarities of the fluid in the cavity.

As shown, the soldered connections 8, 9, 18 and 19 are all in the same plane, and on the same side of the transducer axes. In practice, they preferably are oriented thus, except for being angularly displaced 90° about the transducer axes, the orientation illustrated in FIGURE 1, having been adopted purely for convenience in illustration.

Heretofore, it appears that attempts to improve the efficiency of acoustically coupling into and out of a cavity have taken the form of altering the member containing the cavity, as by grinding a flat on the side of a pipe, breaking through the member (e.g., through a pipe wall) into the cavity to expose the active element of the transducer in the cavity, or by installing a special acoustic coupling in the material member. Again, improvement in sensing the acoustic events in the cavity appears to have been confined to parallel measures. The advantages of the construction according to the invention are obvious, since the transducer couplings to the cavity are the ultimate in simplicity, yet highly effective, and involve in no way structural alteration of the material member (e.g., the aforesaid pipe), containing the cavity which is to be excited for test purposes. It is to be noted, however, that it may be necessary to clean, scrape or file the exterior surface of the pipe to remove dirt, rust, scale, or the like, in order to provide a reasonably clean contact area for the transducers. The surface finish of pipe when new or in equivalent condition is satisfactory, particularly where cement is used to mount the transducers. There is inevitably a film of cement at the supposed contact of transducer and pipe surface, which smooths out slight irregularities of finish to provide a coupling practically as good as if there were a pure transducer-pipe-surface interface at region 11.

It will be apparent that extraneous acoustic influences may be coupled to the test cell via the flow system of which it forms a part, as for example, vibrations due to pumps impelling the fluid being tested. Such affects may be obviated in known ways, as by connecting the cell to the flow system via flexible piping and isolating the cell from the mechanical structure of the system, and/or a more or less "quiet" point in the system may be chosen for the cell.

It is also necessary to pay attention to the acoustic terminations of the pipe section L, since elbows, bends, and like structural irregularities of piping, if too close to the cell, may form effective parts of the cavity 1. As a rule of thumb, the cavity 1, considered as that volume in the pipe section in which changes in acoustic properties will affect the output of transducer 12, extends for several pipe section diameters either way from the straight line containing the long axes of transducers 2 and 12, and in many cases, the pipe section L of the cell may actually be shorter than the cavity 1. Similar considerations would prevail, were the test cell to be closed at one end and used to test a given sample of fluid held in the cell as in a container.

Since the acoustic output of transducer 2, as compared to the acoustic output of the pipe wall in response to the acoustic wave energy in the contents of cavity 1, is quite concentrated in the near vicinity of coupling region 11, whereas the latter said acoustic output is distributed more or less uniformly through the wall of pipe section L, transducers 2 and 12 may be located other than as illustrated, for example, side by side, without departing from the principles of the invention. Moreover, the contribution of transducer 2 to the acoustic energy in the material of the wall of pipe section L is fixed insofar as is concerned the component thereof that remains in said wall (i.e., is not transmitted to the wall via the contents of cavity 1) for the coupling of transducer 2 to the pipe-section and the acoustic properties of the wall material are substantially invariable. However, changes in density and/or viscosity of the contents of cavity 1 change the damping effect of the contents of the cavity on the cavity wall, thereby changing the amount of energy transmitted via said wall to transducer 12.

In the foregoing, the main consideration has been to ensure that the acoustic signal picked up by transducer 12 contains, as nearly as possible, a pure and faithful representation of acoustic events due to cavity 1 and the contents thereof. However, such signal is relatively weak and, viewed as a modulated fraction of the acoustic wave energy emitted by transducer 2, may or may not reflect strongly said acoustic events. Moreover, said signal may reflect different events at the same time, for example, changes in the damping effect of the contents of cavity 1, and in the character of its constituents. Hence, it is necessary to provide for distinguishing between a desired component of said signal and an undesired component.

When the desired signal component is that due to occurrence of bubbles in liquid, it is possible to excite the cavity 1 so as to accentuate the effect of bubbles, as compared to changes in viscosity, and the like. Thus, the acoustic system defined essentially by cavity 1, the contents thereof, and transducers 2 and 12, is energized so that standing wave phenomena arise in cavity 1. It is found that if transducer 2 is excited at certain frequencies in a given band of frequencies, the output of transducer 12 for these frequencies peaks strongly as compared to its response to other frequencies relatively close to said certain frequencies. For example, FIGURE 5 shows, in solid line, a frequency response curve of a typical test cell in accordance with the invention as illustrated in FIGURES 1 to 4, inclusive. It is found that if transducer 2 is excited at a frequency corresponding to one of the peaks on the solid line curve, preferably one of the frequencies fcw, the test cell is particularly sensitive to the presence of gas bubbles in a liquid otherwise solidly filling cavity 1.

In FIGURE 5, the frequency band of interest is shown in the range from 100 kc. to 150 kc. While the frequency band, and locations and relative amplitudes of the peaks therein are a function of the physical dimensions, location of transducers 2 and 12, and other design details of the acoustic system as defined above, operation in the band from 100 kc. to 200 kc. provides good coverage of cavity 1. That is, the acoustic wave energy pattern in the cavity is sufficiently effective over the entire cross-section of the cavity 1 that a bubble traversing pipe section L has a marked effect on such pattern regardless of its path through the cavity. At higher frequencies, especially if the cavity cross-section be large, there is more likelihood of the exciting acoustic wave energy beaming across the cavity and leaving gaps in the said pattern via which a bubble might traverse pipe section L without being detected.

Basically, the preferred frequency of excitation is generally close to the resonant frequency of transducer 2 in place on pipe section L. Thus, if the transducer be pulsed at various frequencies in the 100 kc. to 200 kc. band, such as to avoid build-up of standing wave phenomena, the dashed-line frequency response curve of FIGURE 5 will be obtained, which peaks at a frequency $f_{pp}$ which generally is near the free air resonant frequency of the transducer 2. In general, if the free air resonant frequency of transducer 2 is known, it will be found that if the transducer 2 be excited such that standing waves arise in cavity 1, the output of transducer 12 will peak very strongly at at least one frequency close to $f_{pp}$ and therefore close to the free air resonant frequency of the transducer 2. Thus for an $f_{pp}$ in the 100 kc. to 200 kc. band, such peak will normally be a frequency $f_{pp} \pm 5$ kc., e.g., one of the frequencies fcw for the test cell arrangement having the frequency response curve (solid line) of FIGURE 5.

To excite standing waves, it is merely necessary to excite transducer 2 at the chosen frequency either continuously or with sufficiently long pulses. Thus, 50 microsecond-long pulses of A.C. voltage occuring at rates from 2 to 500 pulses per second, assuming suitable cavity dimensions, will create standing waves in the cavity. In general, the larger the diameter of the cavity, the more nearly continuous the excitation must be, in order for a standing wave pattern to arise.

Excitation such that standing waves occur is particularly advantageous where the purpose of the test is to detect gas content of liquids. If a bubble of air, even so small as to be invisible to the naked eye, be introduced into the liquid in the cavity, the output of transducer 12 will fluctuate strongly. Moreover, as the bubble moves through the cavity 1, it will alternately have a cancellation effect and a reinforcing effect on the standing wave pattern, so that the output of transducer 12 fluctuates a number of times, more or less rapidly, during the passage of the bubble.

However, other variations in the character of the contents of cavity 1, e.g., temperature change, which may sometimes induce considerable fluctuation in the output of transducer, generally do not cause such fluctuations to occur as many times and/or at as great a rate as does a bubble.

In practice, it is found that, on the foregoing basis, the effect of a bubble may nearly invariably be distinguished from that due to other causes.

As is evident from the description of FIGURE 5, it is possible to excite the acoustic system so that standing waves do not arise. However, in the absence of standing waves, it is found that the output of transducer 12 less strongly reflects the presence of a bubble and more strongly reflects changes in viscosity and other characteristics of the contents of the cavity, to the extent that it may often be difficult or impossible to detect the presence of a few small bubbles.

The foregoing is found to hold for a wide variety of pipe materials and sizes, for example, stainless steel pipes from 3/8" to 6" nominal diameter (5/8" to 6 5/8" actual outer diameter) for wall thicknesses in range 5 to 40 of the IPS schedules. In the case of lesser pipe sizes, it may be difficult or impossible to distinguish $f_{pp}$, but invariably a strong peak analogous to $f_{pp} \pm 5$ kc. can be located readily by trial. The location and amplitudes of the peaks in the response curve also depends, to some extent, on the location of the transducer 12 with respect to transducer 2, and the relative positions illustrated in FIGURES 1 to 4, are chosen mainly to provide the longest net path through the pipe-section wall material between the transducers, while coupling transducer 12 as strongly as possible to the acoustic wave energy transmitted from cavity 1 into the wall of pipe section L. Obviously, the one transducer could be displaced, lengthwise, on pipe-section L to increase the aforesaid distance. However, pipe section L is excited less and less strongly by the cavity energy as transducer 12 is moved away from transducer 2.

Contact between the transducers and the pipe section should be as nearly as possible purely that of the material of bodies 3 and 13 and pipe section L. Use of pressure to force the transducers tightly against the pipe is desirable for stable, solid contact, the force being applied continuously as a clamping force, unless the transducers are cemented in place, which case the force need be applied only until the cement has set up and hardened. Moreover, the mode of operation described herein envisages pipe section with uniform acoustic characteristics, for occlusions in the wall material, thin spots in the wall, and the like, obviously can effect the way in which the acoustic output of transducer 2 is transmitted to transducer 12.

Suitable transducers are those of the PZT-5 type, which are lead-zirconate-titanate ceramic piezoelectric transducers made by the Clevite Corporation of Ohio, sizes ranging down to 1/8", 1/2" and 0.02 in outer diameter, length and wall thickness, respectively, having been found suitable, and it is for these transducers that the band 100 kc. to 200 kc. applies. Other types of transducers are available that are best worked at frequencies outside that band, but which also would be suitable. The transducer dimensions in general would vary about in proportion to pipe section diameter.

The cement used should be slightly plastic in its hardened state in order to allow for thermal expansion differences between transducer and pipe section.

FIGURE 6 illustrates the test arrangement of FIGURE 1 in combination with suitable electrical circuitry for energizing cavity 1 and examining the result thereof. Here an RF oscillator 22 is provided which is capable of producing an A.C. voltage of constant amplitude and frequency at substantially any frequency in a suitable range, in this instance, 100 kc. to 200 kc. Leads 6 and 7 of transducer 2 are connected to oscillator 22 so as to have the RF voltage of oscillator 22 applied across the electrodes of body 3 of transducer 2. From what has been said hereinabove, an A.C. voltage will develop across leads 16 and 17 of transducer 12, providing that acoustical wave energy arises in cavity 1, and is applied as compressional impulses to face 14 of body 13 of transducer 12 along the cylindrical axis thereof.

The arrangement, as described thus far, is an electrical modulator system in that cavity 1 and the fluid therein, in effect, modulate the RF output of oscillator 22, since after that output has been converted by transducer 2 to acoustic wave energy exciting cavity 1 and the fluid therein, and since transducer 12 reconverts that acoustic wave energy, after it has been modulated and coupled to pipe section L, an RF voltage appears across leads 16 and 17 which includes a component of modulation reflecting the acoustic properties of the cavity and the fluid therein. Conveniently, therefore, the output voltage of transducer 12 is applied, via leads 16 and 17, to a demodulator 32, which last has output leads 36 and 37, across which the modulation in the voltage across leads 16 and 17 appears as a varying D.C. voltage.

The variation of said D.C. voltage may be exhibited or used to operate control devices or other devices. Preferably, it is at least exhibited on a recorder 42 having a chart 43 of the usual sort and a stylus 44 which makes a trace 45 of the amplitude variation of the said D.C. voltage with respect to time on the said chart. For instance, means not shown would move the chart 43 from right to left, as shown in FIGURE 6, at a constant speed, while stylus 44 moves vertically, as shown in FIGURE 6, in proportion to the amplitude of the modulation signal.

The trace 44, as depicted in FIGURE 6, is typical of that observed as a result of a bubble, or several passing through a section of piping in a region therein extending to a point several pipe diameters up stream and down stream from the transducer location. Said region therefore corresponds to cavity 1. During the time of passage, a more or less dense series of vertical fluctuations will appear in tracing 44, which fluctuations are markedly larger than certain of the others depicted in FIGURE 6. Thus, during the time the said others were traced, the contents of the said region corresponding to cavity 1 was substantially gas-free. In practice, the passage of a single bubble is unmistakable, for in response thereto, the recorder stylus more or less "paints" a wide band of closely spaced, or even overlapping, lines on the chart.

Recording is a desirable mode of exhibiting the signal, for under some circumstances it is desirable to have under observation the immediate past history of signals. For example, extraneous events of acoustic effect showing up in the demodulated signal usually generate a recording pattern of a peak or two perceptibly trailing off, whereas a single bubble of gas is enough to generate a number of sharp peaks that abruptly appear and disappear. From this point of view, the demodulated signal could be exhibited by oscilloscope. Of lesser utility, insofar as is concerned examining the modulation over more than a very brief term, are pointer-type indicators, or flashing light signals, and the like.

It is also possible to operate at an exciting voltage the frequency of which is between the frequency of two closely-spaced CW peaks. For example, exciting the transducer 2 at the actual $f_{pp}$ for the bubble-free, or equivalent state of the contents of cavity, will result in the transducer 12 producing a minimum output, except in the presence of gas in the contents of cavity 1, at which time abrupt fluctuations will occur in the output of transducer 12.

The test arrangement, as specified above, and including the electronics thereof, is quite sensitive to bubbles, so sensitive that where there is bubble content that exists continuously, more or less, and is tolerable except in excess of a given value, the recorder stylus may more or less continuously oscillate across the recorder chart at such amplitude as to make it impossible to distinguish intolerable levels of bubble content from tolerable levels. Moreover, the oscillations are likely to occur at such high frequency as to "paint" the record chart, so to speak, i.e., separate consecutive amplitude traces occur so closely as to run on into the other, thus becoming more or less indistinguishable except as more or less solid band of color extending along the horizontal axis of the chart.

In this circumstance, a second demodulator 52 may be provided to demodulate the varying D.C. signal applied via leads 36 and 37 by demodulator 32 to recorder 42. A second recorder 62 is then provided to record, analogous to recorder 42, a trace corresponding to a modulation voltage from demodulator 52 via a pair of leads 56 and 57 connecting the output of the second demodulator and the second recorder. Obviously, the result of demodulating the output of demodulator 32 is a D.C. signal varying in accordance with the envelope of the trace 45 recorded by recorder 42, and this envelope is recorded by recorder 62, to provide a chart trace 65, the amplitude of which varies in proportion to the amount of gas in the liquid through pipe section L. In other words, demodulating the output of transducer 12 a second time provides a running average of the air-content induced peaks in the once-demodulated output of transducer 12. Accordingly, it is possible to distinguish between acceptable and unacceptable gas-content levels since recorder 62 is continuously recording a curve any point of which may be interpreted as the gas content of the liquid averaged over a time interval during which the signal recorded by recorder 42 peaks a number of times. Here, "gas content" is actually a function of bubble size and quantity.

It is obvious that the need for a second demodulation may make recorder 42 superfluous. Again, if it is possible to detect changes in modulation due to gas-content changes, even in the presence of some gas content at all times, both demodulator 52 and recorder 62 are superfluous.

The output of transducer 12 includes an appreciable component having the frequency of excitation of transducer 2. Moreover, since demodulator 32 is essentially a rectifier, the output of demodulator 32 will, in effect, be composed of a fluctuating D.C. component superimposed on a fixed D.C. component. Since the excitation frequency component and the fixed D.C. component contain no useful information, insofar as bubble detection is concerned, and, moreover are respectively much higher and much lower in frequency than the said fluctuating D.C. component, it is desirable to filter out the former components so as to record only the last said component. For example, a capacitor 41 in output lead 36 of demodulator 32 may be provided to block the fixed D.C. component before it gets to recorder 42 and/or demodulator 52.

The considerations involved, in the case of bubble detection, may be concisely summed up by remarking that signal recording is preferably restricted to signals in the band from about 0.1 cycle per second to 20 cycles per second, for this band is not only free from unwanted signal components due to excitation of transducer 2 and to the rectifying action of demodulation, but is also largely free of frequencies due to extraneous mechanical noises.

FIGURE 6 also shows the essentials of a test arrangement according to the invention wherein the environment for the test is a flow system wherein a fluid medium is to be transferred, as by pumping, gravity, or the like from apparatus amounting to a source 82 in which said medium arises, to processing apparatus 72, in which said medium is to be utilized in some fashion with respect to which the character of the medium is of some importance. Thus, the medium may be synthetic, fiber-forming material in liquid form, e.g., viscose and the like, and processing apparatus 72 may be "spinneret" apparatus for spinning out the said material into long filaments or fibers, which last is intended to be made up, eventually, into thread, yarn, and other such end products. As the quality of the fibers and/or of said end products may be adversely effected if the fiber-forming material contains air when being spun, it may be necessary to detect this air for the purpose of taking steps to obviate the effect thereof. Pipe section L, therefore, represents a portion of the piping via which the fiber-forming material is being furnished to apparatus 72 from source 82, and also represents a point in the process sequence wherein it is of value to know whether or not there is air in the material being fed to the apparatus 72.

The case envisaged in FIGURE 6 is where the conduitry or piping including pipe section L existed prior to the test arrangement, and/or was designed without any thought that, at least in the place indicated, in the figure, any testing apparatus of the sort disclosed herein would be provided. Thus, pipe section L is rather a part of the process apparatus than a test cell inserted therein as an afterthought, modification or refinement.

It will be observed that using the test arrangement illustrated in FIGURE 1, is essentially a matter of finding a point in the process system where it is desired to test for bubbles in the viscose, or the like, since the user does not need to be concerned with breaking into the process apparatus as such. Moreover, the user may evaluate without trouble as many possible sites as he pleases, since for this purpose he need only clamp the transducers temporarily to the process piping (and, perhaps, clean the surface areas which the transducers will contact) wherever he pleases, for trial operation thereof, until he finds a site that is suitable. Since the needed contact area is so small, even the presence of dents, gauges, pits, scratches, and the like, in the surface of the piping, will hamper the finding of a suitable site very little, for in essence, what is being looked for is a convex region on the pipe that typically is a fraction of an inch long, which will contact a diameter of the active face of the transducer.

The foregoing advantages carry over to the species of FIGURE 1, insofar as is concerned its aspect of being a cell inserted into an existing system by actually removing a length of piping therefrom and replacing it by the pipe section L as shown in FIGURE 1. Finding a suitable location may involve considerable trial and error, but since a suitable site may be located by clamping the transducers temporarily to likely places on the existing process piping, and trying them out in operation, said piping need not be tampered with until a suitable site is definitely found. Obviously, if the site for the cell had to be located by actually inserting the cell in the process piping, and trying it out, the user might have to cut into the piping at several places before he found a suitable site.

While clamping the transducers, without cementing, to the pipe is treated above as a temporary expedient, clamping alone will suffice in some cases as a permanent or long-term transducer mounting practice. Usually, however, cementing permits greater mechanical simplicity, compactness and stability, and is therefore to be preferred in permanent or long-term installations.

The test arrangement of FIGURES 1 and 6 in some cases are exposed to extraneous acoustic influences that may show up in the output of transducer 12, and can only be dealt with by isolating the cavity 1 therefrom. Thus, in a flow system analogous to that of FIGURE 6, it is frequently possible to choose a test site which is more or less quiet, or to quiet system noise, as that emanating from pumps, and so on.

In particular, the output of transducer 12 is sensitive to damping of the vibrating structure, i.e., the pipe wall portion defining cavity 1. The acoustic wave energy picked up by transducer 12 is more or less distributed through that portion and merely touching the vibrating structure with the hand damps its vibrations, and this is reflected in the modulation signal derived from the output of transducer 12. Moreover, extraneous vibrations can be coupled into the vibrating structure by contact therewith.

The significant acoustic phenomena involved in the kind of testing involved herein occur at very low levels. The basic virtue of the test arrangement is that it combines reliability, structural stability and simplicity with optimum acoustical efficiency, that is substantially as good as could be attained by coupling the transducers directly to the fluid in cavity 1, and by completely isolating the wall of pipe section L from the output of transducer 2 save through said fluid. At the same time, the test arrangement entirely obviates problems inherent in direct coupling to the fluid, without introducing any of its own. While it is true that a higher lever of acoustic transmission is obtainable by direct coupling to the fluid being tested, the real problem is to get a clean signal, so to speak, the level-changes of which sensitively reflect variation in the phenomena under test, for the matter of signal lever per se is easily taken care of, routinely, by amplification, which is generally required in acoustic testing irrespective of mode of acoustic coupling to the test cell, specimen, object, etc.

Obviously, suitable amplifiers may be provided to bring up the level of the output of transducer 12, or to convert from voltage to current, and so on, as may be convenient for the purpose of providing a recordable signal for recorder 42 and/or recorder 62. For example, such expedients as these may be provided to the ends that the signal to be recorded is a minimum in the absence of bubbles, and that zero signal level is recorded at a point halfway across the recorder charts. As these signal handling expedients and their use are well-understood to those skilled in the art, we do not believe it necessary to illustrate them, or to describe them further, herein.

The standing wave mode of operation described above is concerned with the case where the property or entity tested for has a marked effect on standing wave formation. However, other properties of the contents of cavity 1 may have other effects. Thus, independently of, or even in the absence of standing wave phenomena, absorption of the acoustic wave energy transmitted into the cavity may be taken as an index of the viscosity of the material in the cavity. Since the disclosed arrangement of transducers 2 and 12 and pipe section L is contrived with the primary purpose of transferring acoustic wave energy from outside the pipe section L into the cavity 1, and vice versa, the acoustic testing cell according to the invention would be useful in measuring or testing involving measuring or examining the absorptive properties of material in cavity 1. Other measuring and testing applications will be obvious to those skilled in the art wherein the test cell of the invention will find utility as a simple and effective means of transferring acoustic energy into or out of a pipe section, or the like, without interrupting the wall of such pipe section, or the like, and wherein continuous excitation of transducer 2 may or may not be involved. In this connection, it is to be noted that it is known in the prior art to provide but one transducer and to use it as both a receiving and transmitting transducer.

The foregoing is a full and complete description of the invention of the character required by statute, and will suffice one skilled in the art for the purpose of making and using the invention, not only as described herein, but with sundry modifications and for various purposes too numerous to be described herein, without departing from the spirit of the invention and the scope of the claims appended hereto.

We claim:

1. Apparatus for testing liquid, said apparatus comprising, a member having a cavity for enclosing said liquid; a first transducer having an active surface responsive to an input signal applied to said first transducer to create acoustical wave energy in matter contacting said active surface; a second transducer having an active surface responsive in acoustical wave energy in matter contacting the last said active surface to cause said second transducer to produce an output signal representative of the last said acoustical wave energy; said first transducer being mounted with its said active surface in contact with said member, such contact being confined to a substantially zero-area, substantially rectilinear region of said member outside of said cavity; said second transducer being mounted with its said active surface in contact with said member; means for supplying said first transducer with said input signal at a frequency such as to create acoustical wave energy in said member, thereby to create acoustical wave energy in the fluid in said cavity; means responsive to output signal from said second transducer to demodulate said output signal and produce a modulation signal representative of the modulation of said output signal; and means for utilizing said modulation signal as an index of a characteristic offered in said cavity.

2. The invention of claim 1, wherein said member is a pipe section having an external surface having a region thereof contacting the said active surface of said first transducer; said region and the last said active surface being one convex with respect to the other, whereby to define the aforesaid substantially rectilinear region of substantially zero-area.

3. The invention of claim 2, wherein a layer of cement adheres at one side thereof to the last said active surface and at the other side thereof to said region.

4. The invention of claim 2, wherein said pipe has a circular circumference including said region, and said active surface of said first transducer is flat.

5. Improved bubble determination including the steps of
    (1) providing a liquid-confining wall, a first transducer having a first vibratable surface, a second transducer having a second vibratable surface, and liquid in contact with one side of said wall; said first transducer being drivable to cause said first vibratable surface to vibrate, and said second vibratable surface being responsive to vibration mechanically-coupled thereto, to cause said second transducer to produce signal output representative of said vibrations;
    (2) establishing substantially zero-area, substantially rectilinear contact between said first vibratable surface and the surface of the other side of said liquid-confining wall;
    (3) mechanically-coupling said second vibratable surface to said liquid so that vibrations in said liquid vibrate said second vibratable surface;
    (4) driving said first transducer to cause said first vibratable surface to vibrate against said liquid-confining wall at said zero-area, substantially rectilinear contact;
    (5) detecting modulation of said signal output of said second transducer;
    (6) utilizing said modulation as an index of a condition of said liquid.

6. In a system including process apparatus and having a wall confining a liquid used in a process, and wherein it is desirable to test the properties of said liquid without physically altering the structure of said wall, the method comprising establishing substantially zero-area, substantially rectilinear contact between a first vibratable element and an external surface region of a portion of said wall interiorly in contact with a body of said liquid; establishing substantially zero-area contact between a second vibratable element and an external surface region of a portion of said wall interiorly in contact with said body of said liquid; causing said first vibratable element to vibrate against said external surface to create acoustic wave energy in liquid confined by said wall and exposed to vibrations transmitted by said walls to said liquid; sensing vibrations of said second vibratable element and determining a characteristic thereof; utilizing said characteristic as an index of property of said liquid.

7. A liquid testing method comprising; providing a cavity having a wall confining a liquid; establishing substantially zero-area, substantially rectilinear contact between a first vibratable element and an external surface region of a portion of said wall interiorly in contact with a body of said liquid; establishing substantially zero-area contact between a second vibratable element and an external surface region of a portion of said wall interiorly in contact with said body of said liquid; causing said first vibratable element to vibrate against said external surface to create acoustic wave energy in liquid confined by said wall and exposed to vibrations transmitted by said walls to said liquid; sensing vibrations of said second vibratable element and determining a characteristic thereof; utilizing said characteristic as an index of a property of said liquid.

8. The method of testing for gas content of liquid in a cavity defined by a wall continuously circumscribing a body of liquid, said method comprising the steps of
  (1) radiating acoustic wave energy into said cavity via a substantially zero-area, substantially rectilinear region of the external surface of said wall in a direction such as to cause said acoustic wave energy to traverse said body of liquid;
  (2) sensing acoustic wave energy in said body of liquid through a portion of said wall; and
  (3) utilizing a characteristic of such sensed acoustic wave energy as an index of gas content of said liquid.

9. The method of claim 8, wherein step 3 includes twice demodulating said sensed acoustic wave energy.

References Cited by the Examiner
UNITED STATES PATENTS

| | | | |
|---|---|---|---|
| 2,573,390 | 10/1951 | Blanchard | 73—19 X |
| 2,755,662 | 7/1956 | Swengel | 73—67.6 |
| 3,046,780 | 7/1962 | Lebermann | 73—67.6 XR |

OTHER REFERENCES

Text: Ultrasonics—Carlin (2nd edition), McGraw-Hill, Inc., New York, 1960, pages 61–63, 67–78.

RICHARD C. QUEISSER, *Primary Examiner.*